US012222427B2

(12) United States Patent
Ilie et al.

(10) Patent No.: US 12,222,427 B2
(45) Date of Patent: Feb. 11, 2025

(54) METHODS FOR TESTING CONTROLLED RADIATION PATTERN ANTENNA PROCESSING UNITS AND SYSTEMS THEREFOR

(71) Applicant: Orolia Canada Inc., Montreal (CA)

(72) Inventors: Iurie Ilie, Saint-Lazare (CA); Pierre-Marie Le Veel, Montréal (CA); Stephane Hamel, Longueuil (CA); Serge Malo, Montréal (CA); Julien Edmond, Montréal (CA)

(73) Assignee: OROLIA CANADA INC., Montreal (CA)

( * ) Notice: Subject to any disclaimer, the term of this patent is extended or adjusted under 35 U.S.C. 154(b) by 200 days.

(21) Appl. No.: 17/235,372

(22) Filed: Apr. 20, 2021

(65) Prior Publication Data

US 2021/0405211 A1     Dec. 30, 2021

Related U.S. Application Data

(60) Provisional application No. 63/045,475, filed on Jun. 29, 2020.

(51) Int. Cl.
*G01S 19/25*          (2010.01)
(52) U.S. Cl.
CPC ................. *G01S 19/256* (2013.01)
(58) Field of Classification Search
CPC ................................. G01S 19/00–55
See application file for complete search history.

(56) References Cited

U.S. PATENT DOCUMENTS

| | | | | |
|---|---|---|---|---|
| 6,529,740 | B1* | 3/2003 | Ganucheau, Jr. | H04B 7/18558 370/324 |
| 2002/0054611 | A1* | 5/2002 | Seta | H04H 20/67 370/503 |
| 2012/0001810 | A1* | 1/2012 | Soualle | G01S 19/02 343/703 |

(Continued)

OTHER PUBLICATIONS

Proceedings of the 2014 International Technical Meeting of the Institute of Navigation, 2014, O'Brien A Jet Al, "Low-Cost High-Fidelity Data Acquisition System for Precision GNSS Adaptive Antenna Arrays", pp. 371-376, figures 1-2, sections: Introduction; Overview of DAS Hardware; Channel calibration; Experiments.

(Continued)

*Primary Examiner* — Bernarr E Gregory
*Assistant Examiner* — Hailey R Le
(74) *Attorney, Agent, or Firm* — Troutman Pepper Locke LLP

(57) ABSTRACT

A method includes receiving, by a computing device, from a plurality of radiofrequency receivers, a plurality of baseband signals, each of the plurality of baseband signals formed from a radiofrequency signal from a GNSS antenna and a pilot reference signal, wherein the pilot reference signal is the same for each of the baseband signals. One or more of a phase offset, a time offset, or a power offset are calculated for each of the baseband signals based on the pilot reference signal. Each of plurality of baseband signals are adjusted based on the calculated phase offset, time offset, or power offset for each of the baseband signals.

36 Claims, 11 Drawing Sheets

(56) References Cited

U.S. PATENT DOCUMENTS

2016/0050034 A1* 2/2016 Pearse .................. H04B 17/21
                                                                  455/67.14
2017/0227653 A1   8/2017 Carrie et al.
2018/0188379 A1* 7/2018 Whitworth .............. G01S 19/21
2020/0371250 A1* 11/2020 Filarsky ................. G06F 30/20

OTHER PUBLICATIONS

Proceedings of the 22nd International Technical Meeting of the Satellite Division of the Institute of Navigation, 2009, Ilie I et al, "Multi-channel Record and Playback System for GNSS RF/IF Receivers", pp. 2265-2275 figures 1, 9, sections: Introduction; 1. Brief description; 2.2 Test results.

Proceedings of the 25th International Technical Meeting of the Satellite Division of the Institute of Navigation, 2012, Brown Alison et al, "Broadband GPS Data Capture for Signal and Interference Analysis", pp. 136-140 figures 6, 8, 9; sections: Broadband record and playback; Broadband RF remodulator; DFS file combiner.

Proceedings of the 13th International Technical Meeting of the Satellite Division of the Institute of Navigation, 2000, Andrew Cartmell, "Considerations for Calibration of Frequency Dependent Delays", pp. 789-809 figures 2, 7; table I; sections: 1) Introduction; 2) The frequency dependent delays; 3) Current reduction techniques; 6) Considerations for an on-line calibration system; 7) Initial results from an on-line calibration system; Conclusions.

Combined Search and Examination Report Under Sections 17 and 18(3) of the UK Intellectual Property Office, dated Feb. 23, 2022.

* cited by examiner

METHODS FOR TESTING CONTROLLED RADIATION PATTERN ANTENNA PROCESSING UNITS AND SYSTEMS THEREFOR

This application claims benefit of U.S. Provisional Patent Application No. 63/045,475 filed Jun. 29, 2020 the entirety of which is incorporated herein by reference.

FIELD

This technology generally relates to systems and methods for testing controlled radiation pattern antenna (CRPA) processing units and systems therefore. More specifically, the technology relates to methods for testing CRPA processing units using a recording and playback system. Even further, the technology relates to methods and systems for recording the signal from global navigation satellite system antenna outputs to test the CRPA processing units.

BACKGROUND

Controlled radiation pattern antenna (CRPAs) are often utilized in GNSS applications to protect the GNSS receivers against interference or jammers. CRPAs are usually tested either using GNSS and interference signals received directly from the live sky, or by transmitting artificial GNSS and interference signals inside an anechoic chamber. The use of an anechoic chamber allows for better control of phase and time delays between antenna elements, but adds additional cost to the testing. Radiation based tests, using either the live sky signal or artificial signals in an anechoic chamber, allow for testing both the antenna units and the processing units of the CRPA system. It is also possible to test a CRPA system through conductive testing using wave-front simulators, but those tests only cover the processing unit of the CRPA system with simulated artificial antenna elements and do not consider the real CRPA antenna elements.

Recording and playback techniques can be used to bridge the gap between radiation based tests and conductive tests for CRPA systems. Using these techniques, the GNNS and interference signals can be recorded at the output of each of the CRPA elements (nodes) and played back later in the laboratory environment by connecting the record and playback unit to the antenna element inputs of the processing unit of the CRPA system in a repeatable way. However, current methods of recording and playback require expensive and dedicated hardware in order to achieve the necessary tight phase alignment between the recorded and played back radiofrequency signals. Further, current methods do not provide the capability to add artificial pre-recorded signals to the signal to the playback.

SUMMARY

A method includes receiving, by a computing device, from a plurality of radiofrequency receivers, a plurality of baseband signals, each of the plurality of baseband signals generated from a radiofrequency signal from a GNSS antenna and a pilot reference signal. The pilot reference signal is the same for each of the baseband signals. One or more of a phase offset, a time offset, or a power offset are calculated for each of the baseband signals based on the pilot reference signal. Each of plurality of baseband signals are adjusted based on the calculated phase offset, time offset, or power offset for each of the baseband signals.

A non-transitory machine readable medium having stored thereon instructions comprising executable code that when executed by one or more processors, cause the processors to receive from a plurality of radiofrequency receivers, a plurality of baseband signals, each of the plurality of baseband signals generated from a radiofrequency signal from a GNSS antenna and a pilot reference signal. The pilot reference signal is the same for each of the baseband signals. One or more of a phase offset, a time offset, or a power offset are calculated for each of the baseband signals based on the pilot reference signal. Each of plurality of baseband signals are adjusted based on the calculated phase offset, time offset, or power offset for each of the baseband signals.

A GNSS record and playback apparatus includes a memory comprising programmed instructions stored thereon and one or more processors configured to be capable of executing the stored programmed instructions to receive from a plurality of radiofrequency receivers, a plurality of baseband signals, each of the plurality of baseband signals generated from a radiofrequency signal from a GNSS antenna and a pilot reference signal. The pilot reference signal is the same for each of the baseband signals. One or more of a phase offset, a time offset, or a power offset are calculated for each of the baseband signals based on the pilot reference signal. Each of plurality of baseband signals are adjusted based on the calculated phase offset, time offset, or power offset for each of the baseband signals.

This technology provides a number of advantages including providing systems and methods for recording GNSS signals, adjusting the recorded GNSS signals, and playing recorded GNSS signals back for testing a CRPA system. The hardware required provides a cost efficient solution for record and playback operations. The architecture is also compatible with GNSS simulator systems. Additionally, this technology provides methods and systems that provide for GNSS record and playback with continuous time, phase, and/or power offset correction. Further, additional artificial or pre-recorded jammers can be associated with the signals during playback for more comprehensive testing of the CRPA system.

DETAILED DESCRIPTION

Figure 1:
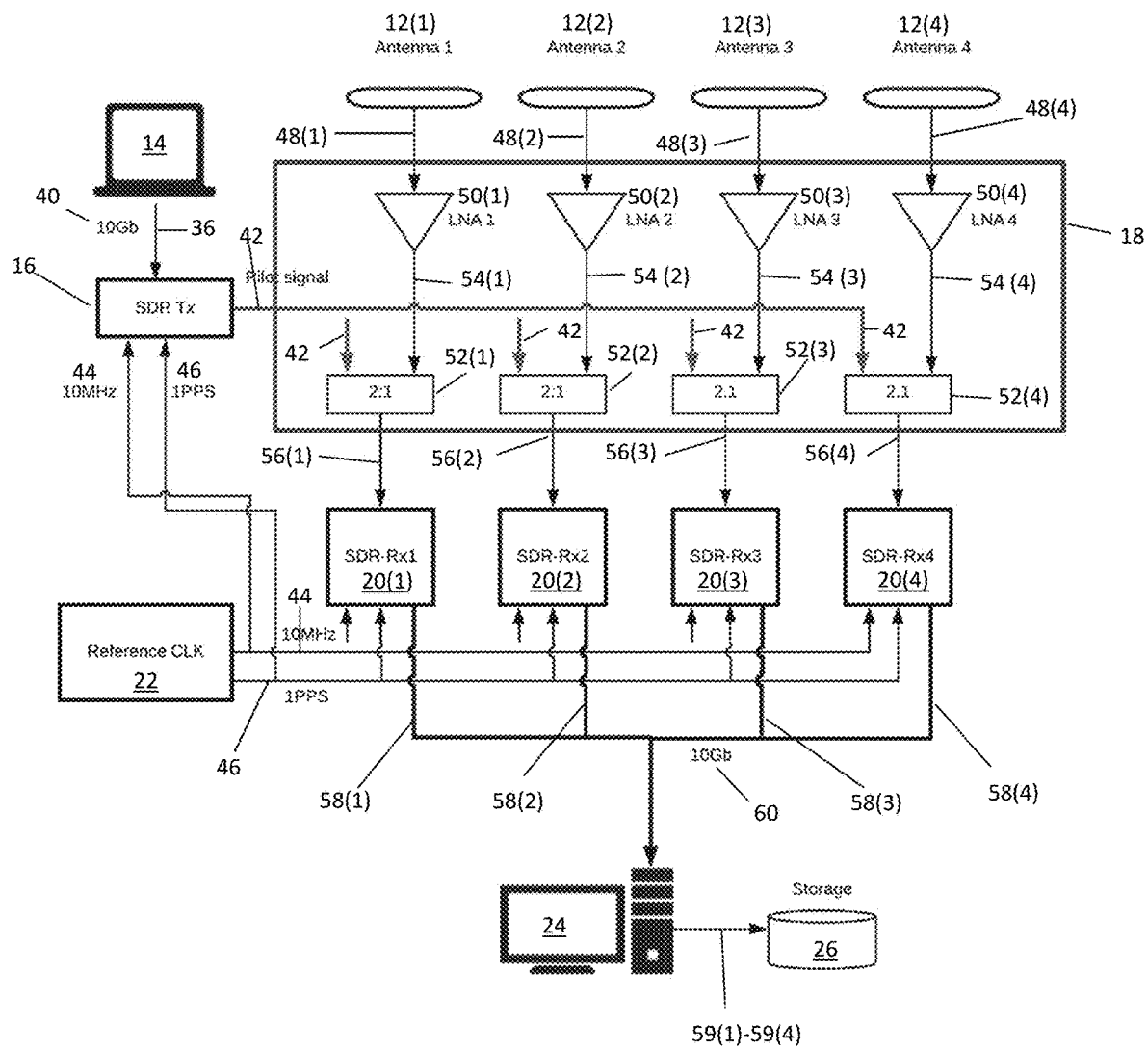
FIG. 1 is a block diagram of an example of a global navigation satellite system (GNSS) recording system for testing controlled radiation pattern antennas (CRPAs).

An example of an architecture for a global navigation satellite (GNSS) recording system 10 that may be employed for recording and adjusting GNSS signals for testing a plurality of controlled radiation pattern antenna (CRPA) elements 12(1)-12(4) is illustrated in FIG. 1. Although four CRPA elements 12(1)-12(4) are illustrated, it is to be understood that the GNSS recording system 10 could be employed with other types and/or numbers of antenna elements employed in a GNSS. The GNSS recording system 10 in this example records the GNSS signals received from the output of the CRPA elements 12(1)-12(4). In one example, the GNSS signals are received by the CRPR elements 12(1)-12(4) from the live sky, although the GNSS signals could be provided by a wavefront simulator.

In this example, the GNSS recording system 10 includes a monitoring computing device 14, a transmit software defined radio (transmit SDR) 16, a receiver apparatus 18, receive software defined radios (receive SDRs) 20(1)-20(4), a reference clock 22, a SDR control computing device 24, and a storage device 26, although other types and/or numbers of other systems, devices, components, and/or other elements in other configurations may be used, such as other types and/or numbers of transmitters and/or receivers, or other electronics. Although the transmit SDR 16 and the receive SDRs 20(1)-20(4) are described in this example for recording and adjusting GNSS signals, it is to be understood that each of the SDRs in the recording architecture of the GNSS recording system 10 could be employed to provide either receive or transmit functionality.

This technology provides a number of advantages including providing a relatively low cost system that employs off-the-shelf software defined radios that allows for capturing and recording GNSS signals from the live sky and applying precise phase, time, and/or power offset adjustment. The recorded GNSS signals can then played back as described below for testing the CRPA elements 12(1)-12(4). The system advantageously provides for continuous calibration that allows for improved accuracy in phase, time, and/or power adjustments during the record and playback operations. The system also can be utilized to provide artificial or pre-recorded jammers and/or spoofers during the playback of the recorded GNSS signals as described below.

In this example, the GNSS recording system 10 incorporates the monitoring computing device 14 and the SDR control computing device 24, although in other examples, the GNSS recording system 10 may include other types and/or numbers of computing devices. Two separate computing devices are utilized in this example for advantages of distributed processing. However, in yet another example, the GNSS recording system 10 may include a single computing device that provides both the monitoring and SDR control functionalities described with respect to the monitoring computing device 14 and the SDR control computing device 24 below.

Figure 2:
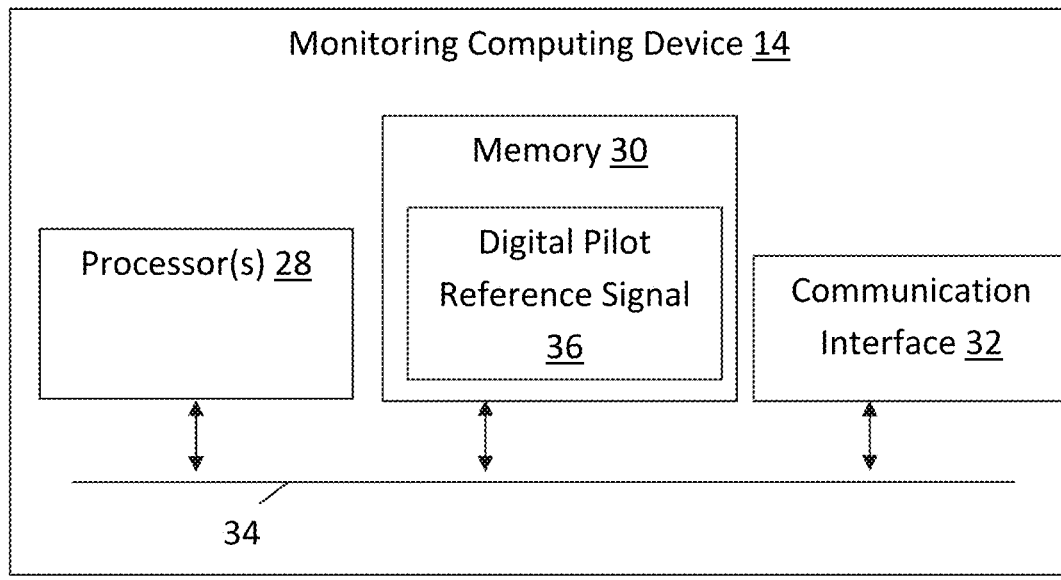
FIG. 2 is a block diagram of a monitoring computing device of the GNSS recording system of FIG. 1.

Referring now to FIG. 2, in this example the monitoring computing device 14 includes one or more processor(s) 28, a memory 30, and a communication interface 32 that are coupled together by a bus 34 or other communication link, although the monitoring computing device 14 can include other types and/or numbers of elements in other configurations.

The processor(s) 28 of the monitoring computing device 14 may execute programmed instructions stored in the memory 30 for any number of the functions or other operations illustrated and described by way of the examples herein, including generating a digital reference pilot signal 36 (as shown in FIG. 1), by way of example only. The processor(s) 28 of the monitoring computing device 14 may include one or more graphic processing units (GPUs), CPUs, or general processors with one or more processing cores, for example, although other types of processor(s) can be used.

The memory 30 of the monitoring computing device 14 stores the programmed instructions for one or more aspects of the present technology as illustrated and described herein, although some or all of the programmed instructions could be stored elsewhere. A variety of different types of memory storage devices, such as random access memory (RAM), read only memory (ROM), hard disk drive (HDD), solid state drives (SSD), flash memory, or other computer readable medium that is read from and written to by a magnetic, optical, or other reading and writing system that is coupled to the processor(s) 28 can be used for the memory.

Figure 4:
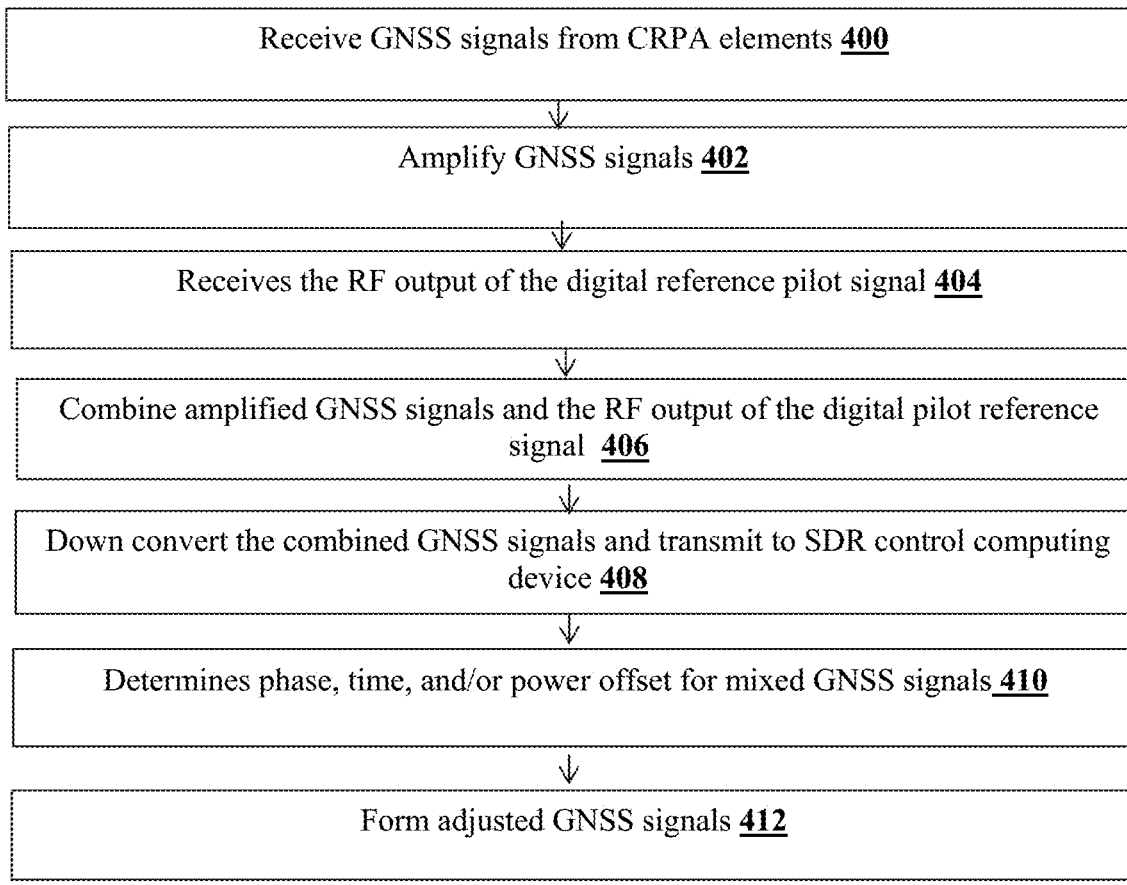
FIG. 4 is a flow chart of the method of recording and adjusting GNSS signals using the GNSS recording system of FIG. 1.
Figure 5:
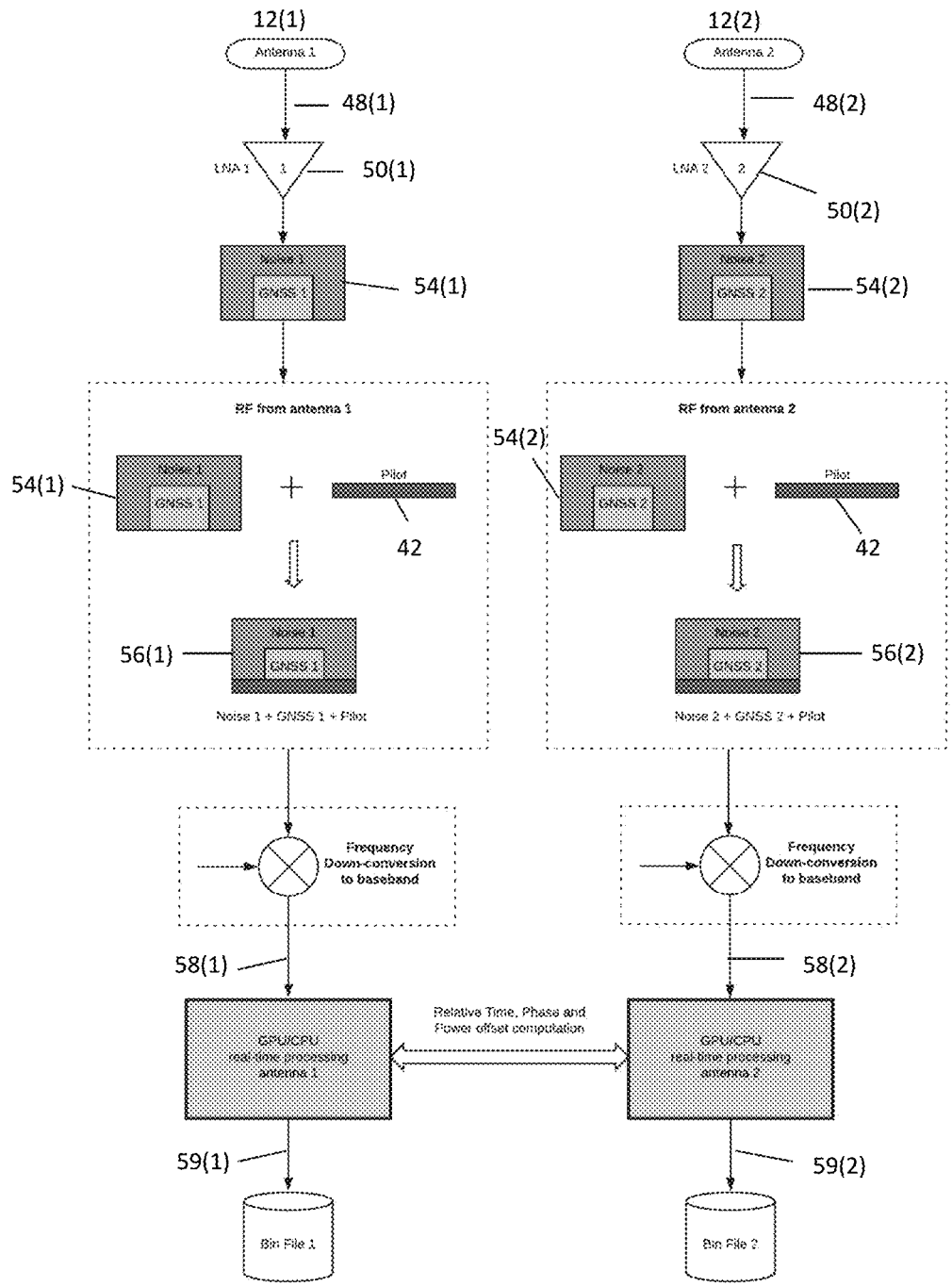
FIG. 5 is a flow diagram of the method of recording and adjusting GNSS signals using the GNSS recording system of FIG. 1.
Figure 6:
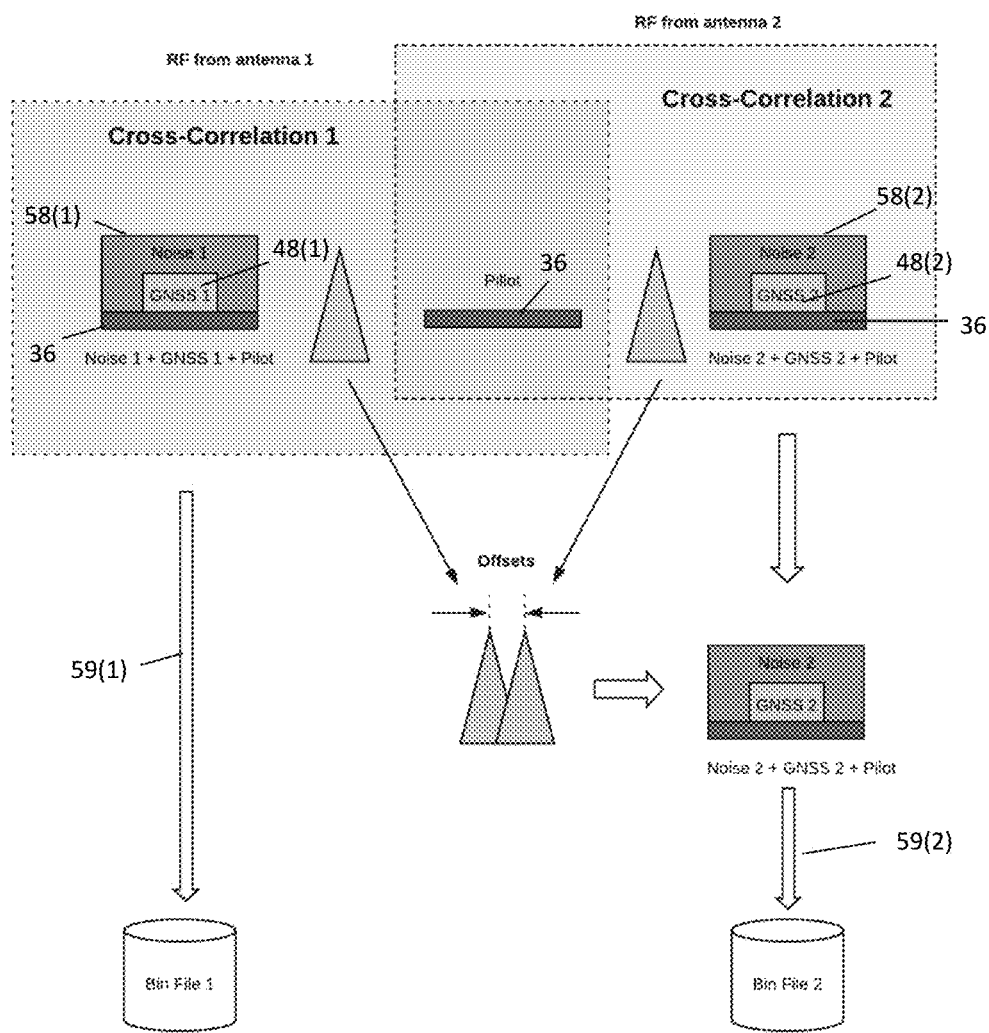
FIG. 6 is a block diagram illustrating one example of a pre-processing protocol for the GNSS recording system of FIG. 1.

Accordingly, the memory 30 of the monitoring computing device 14 can store application(s) that can include executable instructions that, when executed by the monitoring computing device 14, cause the monitoring computing device 14 to perform actions, such as to generate the digital pilot reference signal 36, or other reference signals, and to perform other actions illustrated and described by way of the examples herein, such as in FIGS. 4-6. The application(s) can be implemented as modules or components of other application(s). Further, the application(s) can be implemented as operating system extensions, modules, plugins, or the like. In one example, the application stored on the monitoring computing device 14 is a software-defined GNSS/GPS signal simulator such as the Skydel software produced by Orolia Canada (Montreal, Canada), although other simulation application(s) for generating the digital pilot reference signal 36, or other reference signals, may be stored in the memory 30 the monitoring computing device 14.

The monitoring computing device 14 is configured to generate the digital reference pilot signal 36 that is sent to the transmit SDR 16, as shown in FIG. 1. The communication interface 32 of the monitoring computing device 14 operatively couples and allows for communication between the monitoring computing device 14, the transmit SDR 16, and the SDR control computing device 24, which are all coupled together by one or more communication network(s), although other types and/or numbers of connections and/or configurations to other device and/or elements can be used. In this example, the monitoring computing device 14 is coupled to the transmit SDR 16 by a high data rate (e.g., 10 Gb) Ethernet connection 40, as shown in FIG. 1, and to the SDR control computing device 24 by a low rate (e.g., 1 Gb) Ethernet connection (not shown), although other topologies may be employed, including the use of the same communication network. By way of example only, the communication network(s) can include any number and/or types of communication networks, such as described herein. local area network(s) (LAN(s)) or wide area network(s) (WAN (s)), and/or wireless networks, although other types and/or number of protocols and/or communication network(s) can be used.

Referring again to FIG. 1, the transmit SDR 16 is coupled to the monitoring computing device 14 to receive the digital pilot reference signal 36 generated by the monitoring computing device 14 for the operations described herein. In this example, the transmit SDR 16 is coupled to the monitoring computing device 14 by the 10 Gb Ethernet communication network 40 to receive the digital pilot reference signal 36, although the transmit SDR 16 could receive other signals from the monitoring computing device 14 over other communication networks. By way of example only, the transmit SDR 16 could be the USRP X300 or the USRP N310 made by Ettus Research (Austin, Texas), although other SDRs, or other transmitters, could be utilized. Further, the transmit SDR 16 may also have receive functionality for performing other operations as described herein. The transmit SDR 16 is configured to up convert the digital pilot reference signal 36 to a radiofrequency (RF) output of the digital pilot reference signal 42 for use by the receiver apparatus 18 as described below. In this example, the transmit SDR 16 is also coupled to the reference clock 22 to synchronize the transmit SDR 16 with the receive SDRs 20(1)-20(4). The reference clock 22 utilizes both a 10 MHz clock signal 44 and a 1 PPS clock signal 46 as illustrated in FIG. 1, although other clock signals may be employed for synchronization of the various SDRs employed.

The receiver apparatus 18 is configured to receive GNSS signals 48(1)-48(4) from the CRPA elements 12(1)-12(4), as well as the RF output of the digital pilot reference signal 42 from the transmit SDR 16. In one example, the receiver apparatus 18 is configured to be coupled to an output of each of the CRPA elements 12(1)-12(4), as well as an output of the transmit SDR 16. In one example, the GNSS signals 48(1)-48(4) are received from the CRPA antenna elements 12(1)-12(4) from the live sky. The receiver apparatus 18 can be configured to operate with antennas operating using any navigation system, such as by way of example only, GPS, BeiDou, Galileo, or GLONASS. Although the receiver apparatus 18 is illustrated as receiving GNSS signals 48(1)-48(4) from four CRPA elements 12(1)-12(4) in FIG. 1, it is to be understood that the receiver apparatus 18 could receive any number of GNSS signals from any number and/or types of antenna elements.

In this example, the receiver apparatus 18 includes low noise amplifiers (LNAs) 50(1)-50(4) and 2:1 combiners 52(1)-52(4), although the receiver apparatus 18 can include other types and/or number of elements, such as other analog devices for conditioning the signals, in other combinations. The LNAs 50(1)-50(4) amplify the received GNSS signals 48(1)-48(4) to produce amplified GNSS signals 54(1)-54(4). As described below, the amplified GNSS signals 54(1)-54(4) are mainly noise as the GNSS signals 48(1)-48(4) are below the thermal noise floor. The 2:1 combiners 52(1)-52(4) are configured to combine each of the amplified GNSS signals 54(1)-54(4) with the RF output of the digital pilot reference signal 42 received from the transit SDR 16 to form mixed GNSS signals 56(1)-56(4) that include the amplified GNSS signals 54(1)-54(4) plus the RF output of the digital pilot reference signal 42. In this example, the same RF output of the digital pilot reference signal 42 is applied to each of the amplified GNSS signals 54(1)-54(4), which are based on the GNSS signals 48(1)-48(4) received from the CRPA elements 12(1)-12(4). The receiver apparatus 18 outputs the mixed GNSS signals 56(1)-56(4) including the amplified GNSS signals 54(1)-54(4) associated with the same RF output of the digital reference pilot signal 42 to the receive SDRs 20(1)-20(4).

In this example, four receive SDRs 20(1)-20(4) are employed. By way of example only, the receive SDRs 20(1)-20(4) could be the USRP X300 or the USRP N310 made by Ettus Research (Austin, Texas), although other SDRs, or other radiofrequency receivers, could be utilized. The receive SDRs 20(1)-20(4) are coupled to the receiver apparatus 18 to receive the mixed GNSS signals 56(1)-56(4) for each of the CRPA elements 12(1)-12(4) being recorded, although other types of antenna elements may be recorded. Although four receive SDRs 20(1)-20(4) are illustrated, any number of receive SDRs could be employed based on the number of antenna elements being recorded for testing purposes. The receive SDRs 20(1)-20(4) are configured to down convert the received RF mixed GNSS signals 56(1)-56(4) to baseband mixed GNSS signals 58(1)-58(4). The baseband mixed GNSS signals 58(1)-58(4) each include the digital pilot reference signal 36. Although the receive SDRs 20(1)-20(4) are described, it is to be understood that other radiofrequency receivers could be employed. Further, the receive SDRs 20(1)-20(4) may also have transmit functionality for performing other operations as described herein.

In this example, the receive SDRs 20(1)-20(4) are coupled to the SDR control computing device 24 through a high rate (e.g., 10 Gb) Ethernet connection 60, although other topologies may be employed. In this example, the receive SDRs 20(1)-20(4) are also coupled to the reference clock 22 to synchronize the receive SDRs 20(1)-20(4) with the transmit SDR 16. The reference clock 22 utilizes both the 10 MHz clock signal 44 and the 1 PPS clock signal 46 as illustrated in FIG. 1, although other clock signals may be employed for synchronization.

Figure 3:
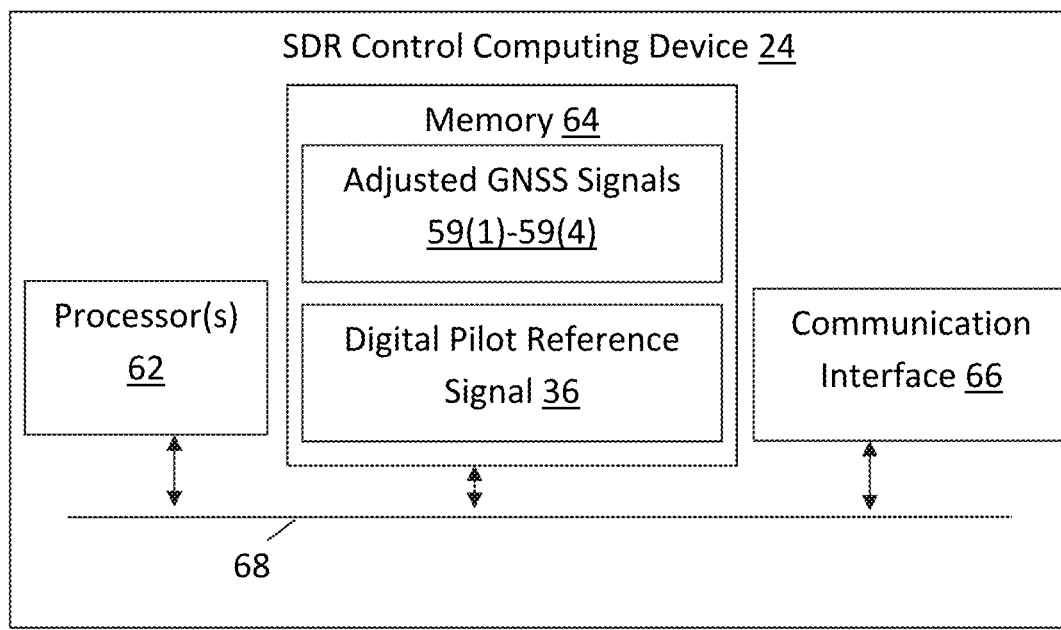
FIG. 3 is a block diagram of an example of a SDR control computing device of the GNSS recording system of FIG. 1.

Referring now to FIG. 3, in this example the SDR control computing device 24 includes one or more processor(s) 62, a memory 64, and a communication interface 66 that are coupled together by a bus 68 or other communication link, although the SDR control computing device 24 can include other types and/or numbers of elements in other configurations. In another example, one or more of the functions of the SDR control computing device 24 may be performed on the monitoring computing device 14.

In this example, the processor(s) 62 of the SDR control computing device 24 may execute programmed instructions stored in the memory 64 for any number of the functions or other operations illustrated and described by way of the examples herein, including computing phase, time/or, and power offsets for the each of the mixed GNSS signals 56(4)-56(4) using the baseband mixed GNSS signals 58(1)-58(4), as well as applying the calculated offsets for phase, time, and/or power adjustment to the baseband mixed GNSS signals 58(1)-58(4) in real-time, removing the digital pilot reference signal 36 from the baseband mixed GNSS signals 58(1)-58(4) to form adjusted GNSS signals 59(1)-59(4) (adjusted for phase, time, and/or power) (as shown in FIG. 1), and storing the adjusted baseband GNSS signals in the memory 64 or storage device 26 (as shown in FIG. 1), by way of example. Referring again to FIG. 3, the processor(s) 62 of the SDR control computing device 24 may include one or more CPUs, GPUs, or general processors with one or more processing cores, for example, although other types of processor(s) can be used. In this example, the high rate data processing for computing phase, time/or, and power offsets for the each of the baseband mixed GNSS signals 58(1)-58(4) (shown in FIG. 1) is performed using GPUs to provide real-time adjustment, although other types and/or numbers of processors may be utilized.

The memory 64 of the SDR control computing device 24 stores the programmed instructions for one or more aspects of the present technology as illustrated and described herein, although some or all of the programmed instructions could be stored elsewhere. The memory 64 of the SDR control computing device 24 may also be used to store the adjusted baseband GNSS signals 59(1)-59(4) generated as described below, although the adjusted baseband GNSS signals 59(1)-59(4) may be stored in other locations, such as on the storage device 26. A variety of different types of memory storage devices, such as random access memory (RAM), read only memory (ROM), hard disk drive (HDD), solid state drives (SSD), flash memory, or other computer readable medium that is read from and written to by a magnetic, optical, or other reading and writing system that is coupled to the processor(s) 62 can be used for the memory 64.

Accordingly, the memory 64 of the SDR control computing device 24 can store application(s) that can include executable instructions that, when executed by the SDR control computing device 24, cause the SDR control computing device 24 to perform actions, such as performing a cross-correlation analysis of the baseband mixed GNSS signals 58(1)-58(4) (which each include the digital pilot reference signal 36) to determine time, phase, and/or power offset such as illustrated and described by way of the examples herein such as FIGS. 4-6. The memory 64 of the SDR control computing device 24 can also store the digital pilot reference signal 36 generated by the monitoring computing device 14 and associated with each of the received GNSS signals 48(1)-48(4) from the CRPA elements 12(1)-12(4) (as shown in FIG. 1). The application(s) can be implemented as modules or components of other application(s). Further, the application(s) can be implemented as operating system extensions, modules, plugins, or the like.

The communication interface 66 of the SDR control computing device 24 operatively couples and communicates between the SDR control computing device 24, the receive SDRs 20(1)-20(4), and the monitoring computing device 14, which are all coupled together by one or more communication network(s), although other types and/or numbers of connections and/or configurations to other device and/or elements can be used. In this example, the SDR control computing device 24 is coupled to the receive SDRs 20(1)-20(4) by the high data rate (e.g., 10 Gb) Ethernet connection 60 and to the monitoring computing device 14 by a low rate (e.g., 1 Gb) Ethernet connection (not shown), although other topologies may be employed. By way of example only, the communication network(s) can include local area network(s) (LAN(s)) or wide area network(s) (WAN(s)), and/or wireless networks, although other types and/or number of protocols and/or communication network(s) can be used.

Referring again to FIG. 1, optional storage device 26 is coupled to the SDR control computing device 24. The storage device 26 can be employed to store the adjusted baseband GNSS signals 59(1)-59(4) generated by the SDR control computing device 24 for use, by way of example, in a playback operation as described herein. The storage device 26 can include a variety of different types of memory storage devices, such as random access memory (RAM), read only memory (ROM), hard disk drive (HDD), solid state drives (SSD), flash memory, or other computer readable medium that is read from and written to by a magnetic, optical, or other reading and writing system.

Although the monitoring computing device 14, SDR control computing device 24, and the receiver apparatus 18 are illustrated and described in the illustrative examples herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s). In some examples, the devices can be part of a rackmount system.

Portions of all of the examples of the technology illustrated and described herein may also be embodied as one or more non-transitory computer readable media having instructions stored thereon for one or more aspects of the present technology. The instructions in some examples include executable code that when executed by the processor(s) 28, 62 of either the monitoring computing device 14 or the SDR control computing device 24, cause the processor(s) 28, 62 to carry out steps necessary to implement the methods of the examples of this technology that are illustrated and described herein.

An exemplary for recording and adjusting GNSS signals for phase, time, and/or power offset, such as the GNSS signals 48(1)-48(4) received from the CRPA elements 12(1) 12(4) as shown in FIG. 1, will now be discussed with reference to FIGS. 1-6. The exemplary method may be utilized to generate adjusted GNSS signals that are adjusted for phase, time, and/or power offsets that may be used in a playback operation to test the CRPA elements 12(1)-12(4), by way of example. FIG. 4 is a flow chart of the exemplary method for recording and adjusting GNSS signals using the GNSS recording system 10 shown in FIG. 1. FIG. 5 is a flow diagram of the data flow for recording and adjusting GNSS signals using the GNSS recording system 10 shown in FIG. 1. Although FIG. 5 illustrates the exemplary method for only two CRPA elements 12(1) and 12(2), the data flow is the same for each of the CRPA elements 12(1)-12(4) shown in FIG. 1, and may be employed for any number and/or type of antennal elements for testing.

Referring again to FIGS. 4 and 5, in step 400 the receiver apparatus 18 receives GNSS signals 48(1) and 48(2) from the CRPA elements 12(1) and 12(2). In one example, the GNSS signals 48(1) and 48(2) are received from the CRPA elements 12(1) and 12(2) from the live sky. The receiver apparatus 18 is coupled to the output of CRPA elements 12(1) and 12(2) to receive the RF GNSS signals 48(1) and 48(2).

Next, in step 402, each of the GNSS signals 48(1) and 48(2) are amplified by LNAs 50(1) and 50(2) of the receiver apparatus 18 to produce the amplified GNSS signals 54(1) and 54(2). As shown in FIG. 5, the amplified GNSS signals 54(1) and 54(2) are mainly noise as the GNSS signals 48(1) and 48(2) are below the thermal noise floor.

In step 404, the receiver apparatus 18 receives the RF output of the digital reference pilot signal 42 from the transmit SDR 16, which is based on the digital reference pilot signal 36 that is generated by the monitoring computing device 14. The monitoring computing device 14 provides the digital pilot reference signal 36 to the transmit SDR 16, which converts the digital pilot reference signal 36 to the RF output of the digital pilot reference signal 42. The RF output of the digital pilot reference signal 42 is provided to an input of the receiver apparatus 18. Any pilot reference signal known in the art may be employed, although the pilot reference signal is chosen such that it does not degrade the GNSS signals that the digital pilot reference signal is combined with as described below.

Next, in step 406, the amplified GNSS signals 54(1) and 54(2) are combined with the RF output of the digital pilot reference signal 42 by the 2:1 combiners 52(1) and 52(2) of the receiver apparatus 18 to form the mixed GNSS signals 56(1) and 56(2) for each of the CRPA elements 12(1) and 12(2). The mixed GNSS signals 56(1) and 56(2) respectively include the amplified GNSS signals 54(1) and 54(2) (noise plus the GNSS signals 48(1) and 48(2), respectively), as well as the RF output of the digital pilot reference signal 42. The mixed GNSS signals 56(1) and 56(2) are output receive SDRs 20(1) and 20(2), respectively.

In step 408, the receive SDRs 20(1) and 20(2) provide frequency down-conversion to convert the mixed GNSS signals 56(1) and 56(2) to baseband mixed GNSS signals 58(1) and 58(2) and transmit the baseband mixed GNSS signals 58(1) and 58(2) to the SDR control computing device 24 for pre-processing.

Next, in step 410, the SDR control computing device 24 determines the phase, time, and/or power offset for two of the exemplary baseband mixed GNSS signals 58(1) and 58(2). In one example, the SDR control computing device 24 performs a cross-correlation analysis for the received baseband mixed GNSS signals 58(1) and 58(2), which are based on the GNSS signals 48(1) and 48(2) received from the CRPA elements 12(1) and 12(2).

Referring now to FIG. 6, an exemplary method of determining the phase, time, and/or power offset for two of the exemplary baseband mixed GNSS signals 58(1) and 58(2) using a cross-correlation analysis is illustrated. Each of the baseband mixed GNSS signals 58(1) and 58(2) includes the GNSS signal 48(1) and 48(2), respectively, (which are below the thermal noise floor), as well as the digital reference pilot signal 36. The digital pilot reference signal 36 is generated by the monitoring computing device 14 is also provided to and stored in the memory 64 of the SDR control computing device 24 for the cross-correlation process illustrated in FIG. 6.

To determine the phase, time, and/or power offset, a cross-correlation peak between the baseband mixed GNSS signals 58(1) and 58(2) is obtained using the digital pilot reference signal 36, which is the same for each of the baseband mixed GNSS signals 58(1) and 58(2), although the cross-correlation peak could be determined for other baseband mixed GNSS signals such as baseband mixed GNSS signals 58(3) and 58(4) as shown in FIG. 1. The cross-correlation peak is determined using standard techniques. Cross-correlation peaks may be determined between any number of the CRPA elements 12(1)-12(4) being tested, as shown in FIG. 1. Referring again to FIG. 6, each cross-correlation peak contains information that may be extracted about the time, power, and/or phase offset between the received GNSS signals 48(1) and 48(2), for example, as shown in FIG. 6. The cross-correlation technique may be performed for each of the CRPR elements 12(1)-12(4), for example in the CRPA system 10 shown in FIG. 1, although the technique may be employed with other numbers and/or types of antenna elements. Referring again to FIG. 6, the relative time, power, and/or phase offset between the correlation peaks are measured, averaged, and applied to the baseband mixed GNSS signals 58(1) and 58(2), by way of example, to compensate for the phase, time, and/or power offset. In one example, the cross-correlation pre-processing is performed in real-time using GPUs.

Referring again to FIGS. 4 and 5, in step 412, the relative time, power, and/or phase offset can be used by SDR control computing device 24 to form adjusted GNSS signals 59(1) and 59(2), although other numbers of adjusted GNSS signals can be generated. The digital pilot reference signal 36 can also be removed from the adjusted GNSS signals 59(1) and 59(2). The pre-processing results in adjusted GNSS signals 59(1) and 59(2), for example, that are time, power, and/or phase adjusted.

In step 514, the adjusted GNSS signals 59(1) and 59(2) can then be stored in baseband on either the memory 64 of the SDR control computing device 24 or in the separate storage device 26. In one example, the adjusted GNSS signals are stored as binary files. The recording operation described allows for obtaining multiple synchronized phase coherent recordings. The pre-processing described with respect to FIG. 6 provides for precise control of time and/or phase delays. The continuous calibration allows for highly accurate phase, time, and/or power adjustments during the record and playback of GNSS signals.

Referring again to FIG. 1, in one example, the phase offset can be maintained under about 2 degrees. In one example, the recorded adjusted GNSS signals 59(1)-59(4) can be used for trajectory and attitude (yaw, pitch, role) information by usage of a GNSS receiver. In some examples, a stand-alone antenna and GNSS receiver can be used during the recording for trajectory and attitude information. The trajectory and attitude information can be used during playback, as described below, so that directional jammers are coherent with the dynamics of the receiver as described below. The adjusted GNSS signals 59(1)-59(4) can then be utilized for example in a playback operation for testing the CRPA elements as described below. The stored adjusted GNSS signals 59(1)-59(4) can be used to replicate the original GNSS signals 48(1)-48(4) received at each CRPA element 12(1)-12(4) as shown in FIG. 1.

Figure 7:
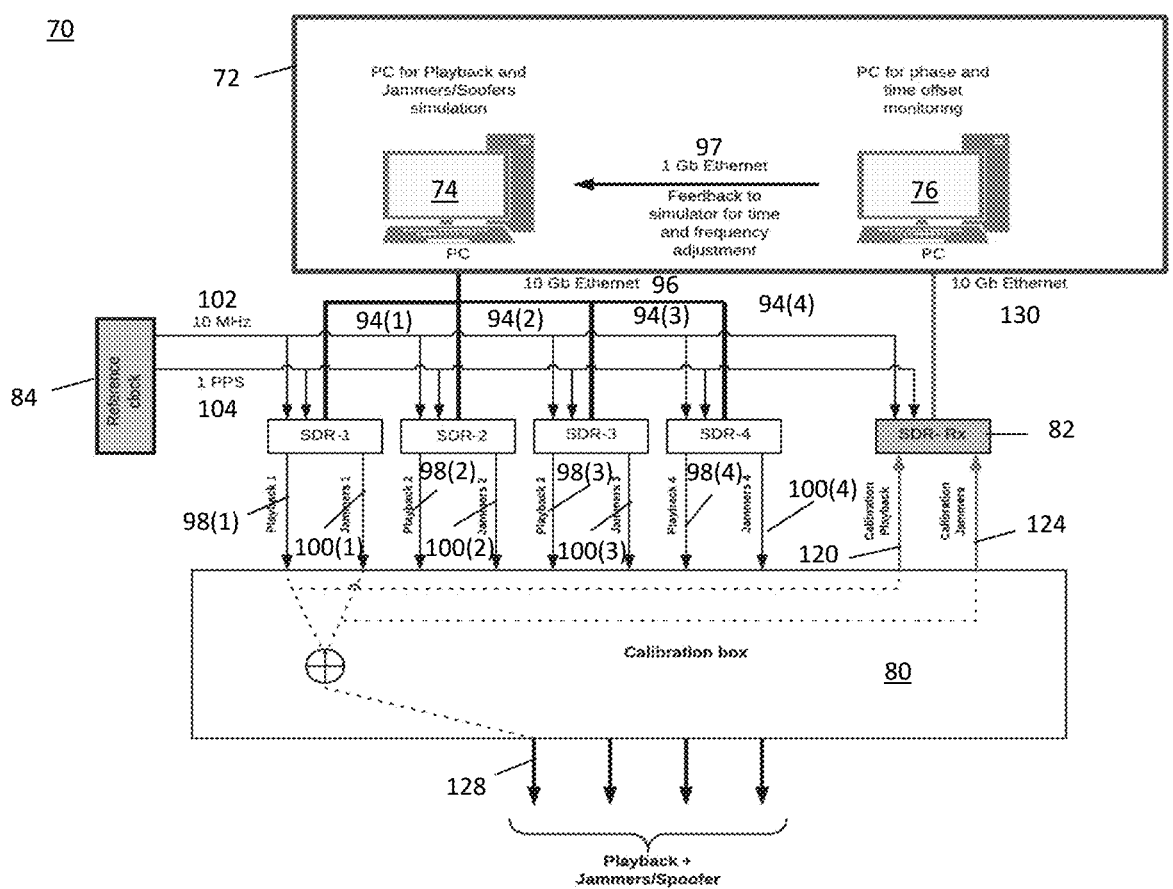
FIG. 7 is a block diagram of an example of a GNSS playback system for testing CRPAs.

An example architecture for a GNSS playback system 70 that may be employed for playback of recorded adjusted GNSS signals, as described above, for testing the plurality of CRPA elements 12(1)-12(4) (as shown in FIG. 1) is illustrated in FIG. 7. In this example, the GNSS playback system 70 includes a wavefront playback apparatus 72 that incorporates a playback computing device 74 and an offset monitoring computing device 76, transmit software defined radios (transmit SDRs) 78(1)-78(4), a distribution device 80, a receive software defined radio (receive SDR) 82, and reference clock 84, although other types and/or numbers of other systems, devices, components, and/or other elements in other configurations may be used. This technology provides a number of advantages including providing a relatively low cost, easily upgradeable GNSS playback system 70 that allows for playback of recorded GNSS signals with precise phase, power, and/or time offset adjustment. The system also allows for combining the playback signals with additional simulated signals, such as directional interference signals. By way of example, simulated signals may be formed as in U.S. patent application Ser. No. 16/837,706, the disclosure of which is hereby incorporated by reference in its entirety.

In one example, the GNSS recording system 10 (FIG. 1) and the GNSS playback system 70 (FIG. 7) can be combined into a single system. By way of example, the described computing devices may be interchanged and the transmit and receive radios may be utilized to have both transmit and receive functionality.

Referring again to FIG. 7, in this example, the wavefront playback apparatus 72 incorporates the playback computing device 74 and the offset monitoring computing device 76, although in other examples, wavefront playback apparatus 72 may include other types and/or numbers of devices. Two separate computing devices may be utilized for advantages of distributed processing. In yet another example, the wavefront playback apparatus 72 may include a single computing device that provides both playback and offset monitoring functionality.

Figure 8:
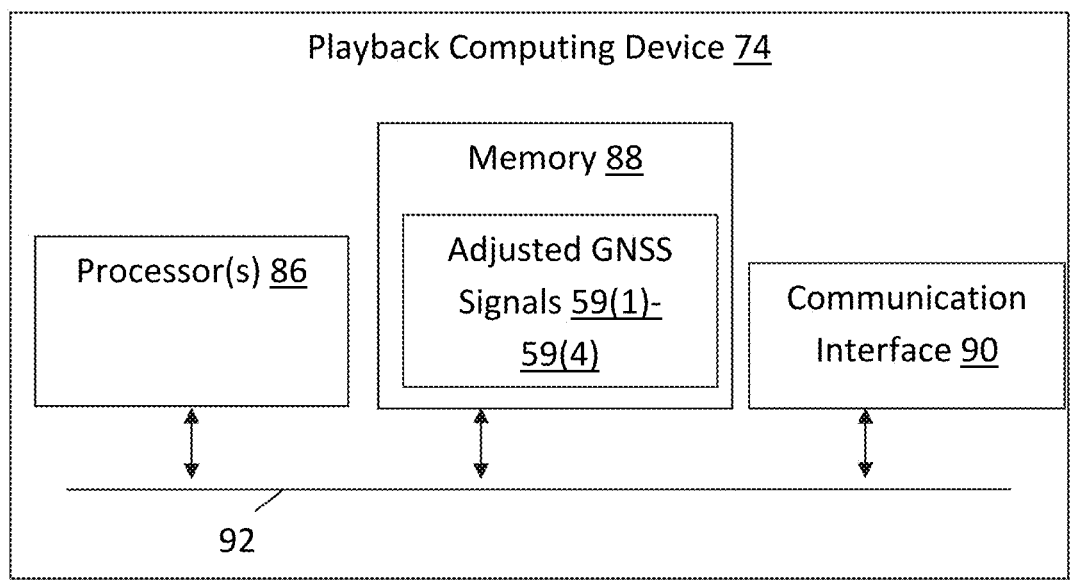
FIG. 8 is a block diagram of a playback computing device of the GNSS playback system of FIG. 7.

Referring now to FIG. 8, in this example the playback computing device 74 includes one or more processor(s) 86, a memory 88, and a communication interface 90 that are coupled together by a bus 92 or other communication link, although the playback computing device 74 can include other types and/or numbers of elements in other configurations.

The processor(s) 86 of the playback computing device 74 may execute programmed instructions stored in the memory 88 for any number of the functions or other operations illustrated and described by way of the examples herein, including playing GNSS signals stored in the memory or generating simulated GNSS signals, by way of example only. The processor(s) 86 of the playback computing device 74 may include one or more graphic processing units (GPUs), CPUs, or general processors with one or more processing cores, for example, although other types of processor(s) can be used.

The memory 88 of the playback computing device 74 stores the programmed instructions for one or more aspects of the present technology as illustrated and described herein, although some or all of the programmed instructions could be stored elsewhere. A variety of different types of memory storage devices, such as random access memory (RAM), read only memory (ROM), hard disk drive (HDD), solid state drives (SSD), flash memory, or other computer readable medium that is read from and written to by a magnetic, optical, or other reading and writing system that is coupled to the processor(s) 86 can be used for the memory 88.

Accordingly, the memory 88 of the playback computing device 74 can store application(s) that can include executable instructions that, when executed by the playback computing device 74, cause the playback computing device 74 to perform actions, such as to playback stored GNSS signals, such as the adjusted GNSS signals 59(1)-59(4) generated by the GNSS recording system 10 as described in the examples of FIGS. 4-6, or generate other simulated signals, and to perform other actions illustrated and described by way of the examples herein. The application(s) can be implemented as modules or components of other application(s). Further, the application(s) can be implemented as operating system extensions, modules, plugins, or the like. In one example, the application stored on the simulation computing device is a software-defined GNSS/GPS simulator such as the Skydel software produced by Orolia Canada (Montreal, Canada), although other simulation application(s) for generating simulated GNSS and interference signals may be stored in the memory of the playback computing device 74.

Referring again to FIG. 7, the playback computing device 74 is configured to output the pre-recorded stored GNSS signals, such as adjusted GNSS signals 59(1)-59(4), as digital complex IQ baseband signals 94(1)-94(4), as shown in FIG. 7. The playback computing device 74 may also include simulated GNSS or interference signals associated with the digital complex IQ baseband signals 94(1)-94(4). The term interference is used to designate non-intentional and intentional jammers, as well as spoofers and repeaters, that can be simulated, although other interference signals may be employed.

In one example, the thermal noise that is part of the recorded GNSS signals, such as the recorded adjusted GNSS signals 59(1)-59(4) in the example of FIGS. 4-6, is used as a reference pilot for the digital complex IQ baseband signals 94(1)-94(4). There is no need to add an artificial pilot signal for each of the CRPA elements 12(1)-12(4) (as shown in FIG. 1) as the thermal noise is different for each of the GNSS signals 48(1)-48(4) from the CRPA elements 12(1)-12(4) that are recorded as described above with reference to FIGS. 4-6. The natural pilot reference provided by the thermal noise is utilized for monitoring the time, phase, and/or power offset.

Referring again to FIG. 7, the recorded adjusted GNSS signals 59(1)-59(4) stored in the playback computing device 74, or any other pre-recorded GNSS signals, may be played back to operate on any navigation system, such as by way of example only, GPS, BeiDou, Galileo, or GLONASS. In one example, the recorded signals may include simulated interference signals such as, by way of example only, spoofers, repeaters, or jammers, although other interference signals may be generated. Each of the pre-recorded GNSS signals are coherent. The playback computing device 74 can also output the pre-recorded GNSS signals to the offset monitoring computing device 76, by way of example, which can utilize the thermal noise in the feedback process.

The communication interface 92 of the playback computing device 74 operatively couples and allows for communication between the playback computing device 74, the transmit SDRs 78(1)-78(4), and the offset monitoring computing device 76, which are all coupled together by one or more communication network(s), although other types and/or numbers of connections and/or configurations to other device and/or elements can be used. In this example, the playback computing device 74 is coupled to the transmit SDRs 78(1)-78(4) by a high data rate (e.g., 10 Gb) Ethernet connection 96 and to the offset monitoring computing device 76 by a low rate (e.g., 1 Gb) Ethernet connection 97, although other topologies may be employed, including the use of the same communication network. By way of example only, the communication network(s) can include any number and/or types of communication networks, such as described herein. local area network(s) (LAN(s)) or wide area network(s) (WAN(s)), and/or wireless networks, although other types and/or number of protocols and/or communication network(s) can be used.

Referring again to FIG. 7, in this example, four transmit SDRs 78(1)-78(4) are employed. By way of example only, the transmit SDRs 78(1)-78(4) could be the USRP X300 or the USRP N310 made by Ettus Research (Austin, Texas), although other SDRs, or other transmitters, could be utilized. The transmit SDRs 78(1)-78(4) are coupled to the playback computing device 74 of the wavefront playback apparatus 72 by high data rate (e.g., 10 Gb) Ethernet connection 96 to receive the digital complex IQ baseband signals 94(1)-94(4) representing the recorded GNSS signals, although any number of transmit SDRs 78(1)-78(4) may employed to receive the digital complex IQ baseband signals 94(1)-94(4). Although the transmit SDRs 78(1)-78(4) are described, it is to be understood that other radiofrequency transmitters could be employed. The digital complex IQ baseband signals 94(1)-94(4) are continuously streamed in real-time to the transmit SDRs 78(1)-78(4). Each of the transmit SDRs 78(1)-78(4) receives an independent one of the digital complex IQ baseband signals 94(1)-94(4) corresponding to a recorded CRPA element 12(1)-12(4), as shown in FIG. 1, from the playback computing device 74.

The transmit SDRs 78(1)-78(4) are configured to up convert the pre-recorded digital complex IQ baseband signals 94(1)-94(4) to radiofrequency (RF) outputs 98(1)-98

(4). In this example, each of the transmit SDRs 78(1)-78(4) generates a corresponding one of the RF outputs 98(1)-98(4) used to playback a pre-recorded GNSS signal. In one example, each to the transmit SDRs 78(1)-78(4) also generates an RF output for a simulated interference signal 100(1)-100(4) associated with the pre-recorded GNSS signals, although other types and/or numbers of RF outputs can be utilized. In this example, the reference clock 84 is coupled to each of the transmit SDRs 78(1)-78(4) and the receive SDR 82 to synchronize each of the transmit SDRs 78(1)-78(4) and the receive SDR 82. The reference clock 84 utilizes both a 10 MHz clock signal 102 and a 1 PPS clock signal 104 as illustrated in FIG. 7, although other clock signals may be employed for synchronization.

Figure 9:
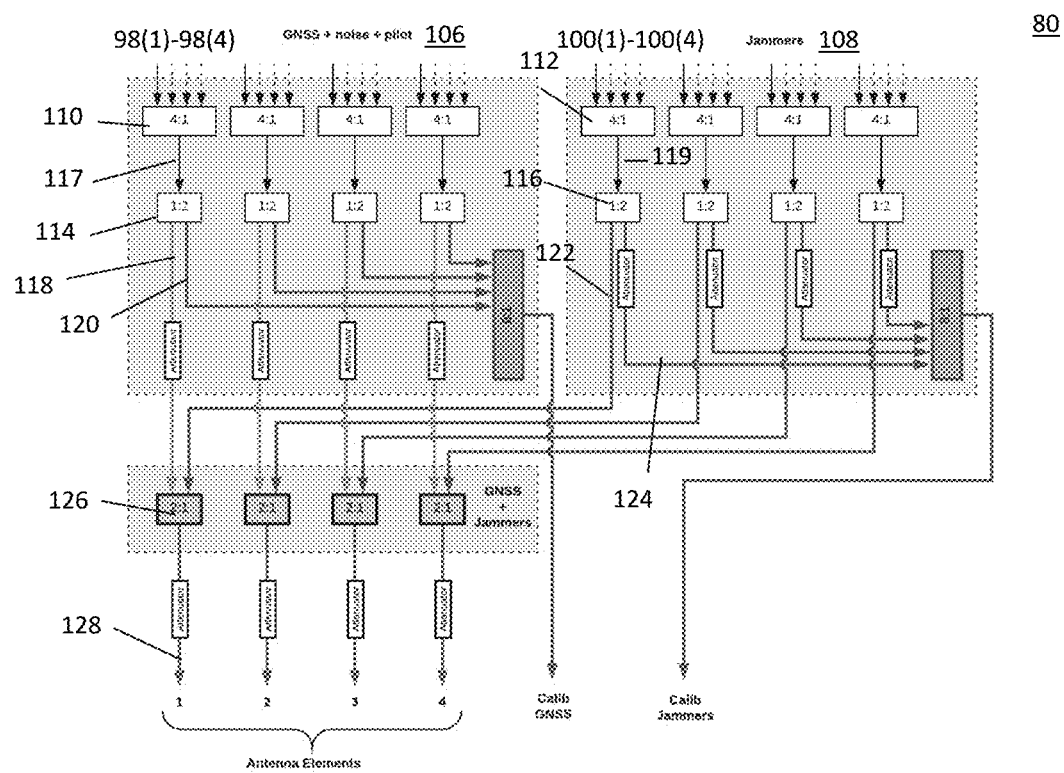
FIG. 9 is a block diagram of a distribution device of the GNSS playback system of FIG. 7.

In this example, the distribution device 80 is coupled to each of the transmit SDRs 78(1)-78(4) to receive the RF outputs 98(1)-98(4) for the pre-recorded GNSS signals and the second RF outputs for simulated interference signals 100(1)-100(4), respectively, from each of the transmit SDRs 78(1)-78(4), although the distribution device 80 may receive other types and/or numbers of signals. Referring more specifically to FIG. 9, in one example, the distribution device 80 includes a GNSS channel 106 and an interference channel 108. The GNSS channel 106 and the interference channel 108 each include a number of passive RF elements including combiners/splitters, although the distribution device 80 may include other types and/or numbers of passive or active elements in other configurations, such as attenuators that are utilized to adjust the power levels of the RF signals. FIG. 9 illustrates the distribution device 80 receiving signals from sixteen transmitters in four groups of four. While the processing of signals from the four transmit SDRs 78(1)-78(4) is described with respect to the example shown in FIG. 9, the distribution device 80 can operate with additional transmit SDRs or other types of radios/transmitters, as shown in FIG. 9, in the same manner.

The distribution device 80 is configured to receive the RF outputs 98(1)-98(4) for the pre-recorded GNSS signals through the GNSS channel 106, and the optional second RF outputs for generating the simulated interference signals 100(1)-100(4) through the interference channel 108. The distribution device 80 combines the RF outputs 98(1)-98(4) for the pre-recorded GNSS signals at a 4:1 combiner 110 and the second RF outputs for the simulated interference signals 100(1)-100(4) at a separate 4:1 combiner 112 to form a combined GNSS signal 117 and a combined interference signal 119, respectively. The use of four inputs allows for coverage of the entire GNSS spectrum for both the RF outputs 98(1)-98(4) of the pre-recorded GNSS signals and the simulated interference signals 100(1)-100(4). The distribution device 80 then splits the combined GNSS signal 117 and a combined interference signal 119 in each channel using 1:2 splitters 114 and 116, respectively, to provide a pre-recorded GNSS output signal 118 and a GNSS calibration signal 120, as well as interference output signal 122 and an interference calibration signal 124 for examples where a simulated interference signal is also employed.

In examples where the pre-recorded GNSS output signal 118 is combined with the simulated interference output signal 122, the distribution device 80 combines the pre-recorded GNSS output signal 118 and the simulated interference output signal 122 using a 2:1 combiner 126 to generate a combined pre-recorded GNSS/simulated interference signal 128. The distribution device 80 is coupled to a CRPA system to provide the pre-recorded GNSS signal for testing the CRPA processing unit, such as the processing unit of CRPA elements 12(1)-12(4) shown in FIG. 1, using the pre-recorded GNSS/simulated interference signal 128. FIG. 9 shows an example where four combined pre-recorded GNSS/simulated interference signals are generated, but other numbers of signals may be generated using other numbers of SDRs or other types of transmitters.

Referring again to FIG. 7, the distribution device 80 outputs the pre-recorded GNSS calibration signal 120 and the interference calibration signal 124 to the receive SDR 82. In one example multiple GNSS calibration signals and interference signals may be combined prior to being output to the receive SDR 82. In this example, the receive SDR 82 is coupled to the distribution device 80 to receive the pre-recorded GNSS calibration signal 120 and the optional interference calibration signal 124. By way of example only, the receive SDR 82 could be the USRP X300 or the USRP N310 made by Ettus Research (Austin, Texas), although other SDRs could be utilized for the receive SDR 82. The receive SDR 82 is configured to down convert the received RF signals for the pre-recorded GNSS calibration signal 120 and the optional interference calibration signal 124 back to baseband. Although the receive SDR 82 is described, it is to be understood that other radiofrequency receivers could be employed In this example, the receive SDR 82 is coupled to the offset monitoring computing device 76 through a high rate (e.g., 10 Gb) Ethernet connection 130, although other topologies may be employed.

Figure 10:
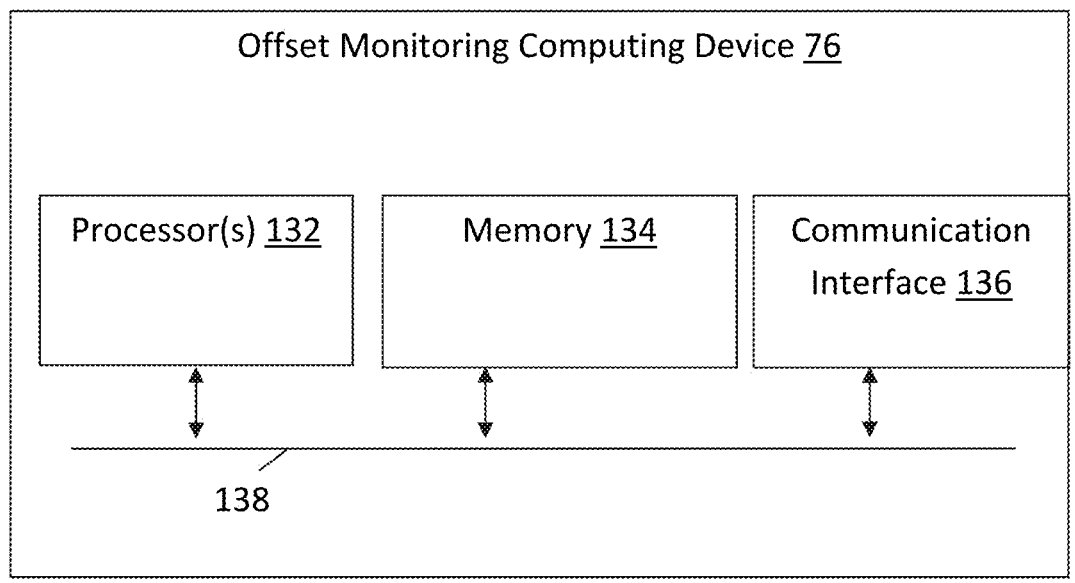
FIG. 10 is a block diagram of an example of an offset monitoring computing device of the GNSS playback system of FIG. 7.

Referring now to FIG. 10, in this example the offset monitoring computing device 76 includes one or more processor(s) 132, a memory 134, and a communication interface 136 that are coupled together by a bus 138 or other communication link, although the offset monitoring computing device 76 can include other types and/or numbers of elements in other configurations. In another example, one or more of the functions of the offset monitoring computing device 76 may be performed on the playback computing device 74.

In this example, the processor(s) 132 of the offset monitoring computing device 76 may execute programmed instructions stored in the memory 134 for any number of the functions or other operations illustrated and described by way of the examples herein, including monitoring phase, time/or, and/or power offsets for the pre-recorded GNSS calibration signal 120 and/or the interference calibration signal 124, as well as providing feedback to the playback computing device 74 for phase, time, and/or power adjustment. The processor(s) 132 of the offset monitoring computing device 76 may include one or more CPUs, GPUs, or general processors with one or more processing cores, for example, although other types of processor(s) can be used.

The memory 134 of the offset monitoring computing device 76 stores the programmed instructions for one or more aspects of the present technology as illustrated and described herein, although some or all of the programmed instructions could be stored elsewhere. A variety of different types of memory storage devices, such as random access memory (RAM), read only memory (ROM), hard disk drive (HDD), solid state drives (SSD), flash memory, or other computer readable medium that is read from and written to by a magnetic, optical, or other reading and writing system that is coupled to the processor(s) can be used for the memory 134.

Figure 11:
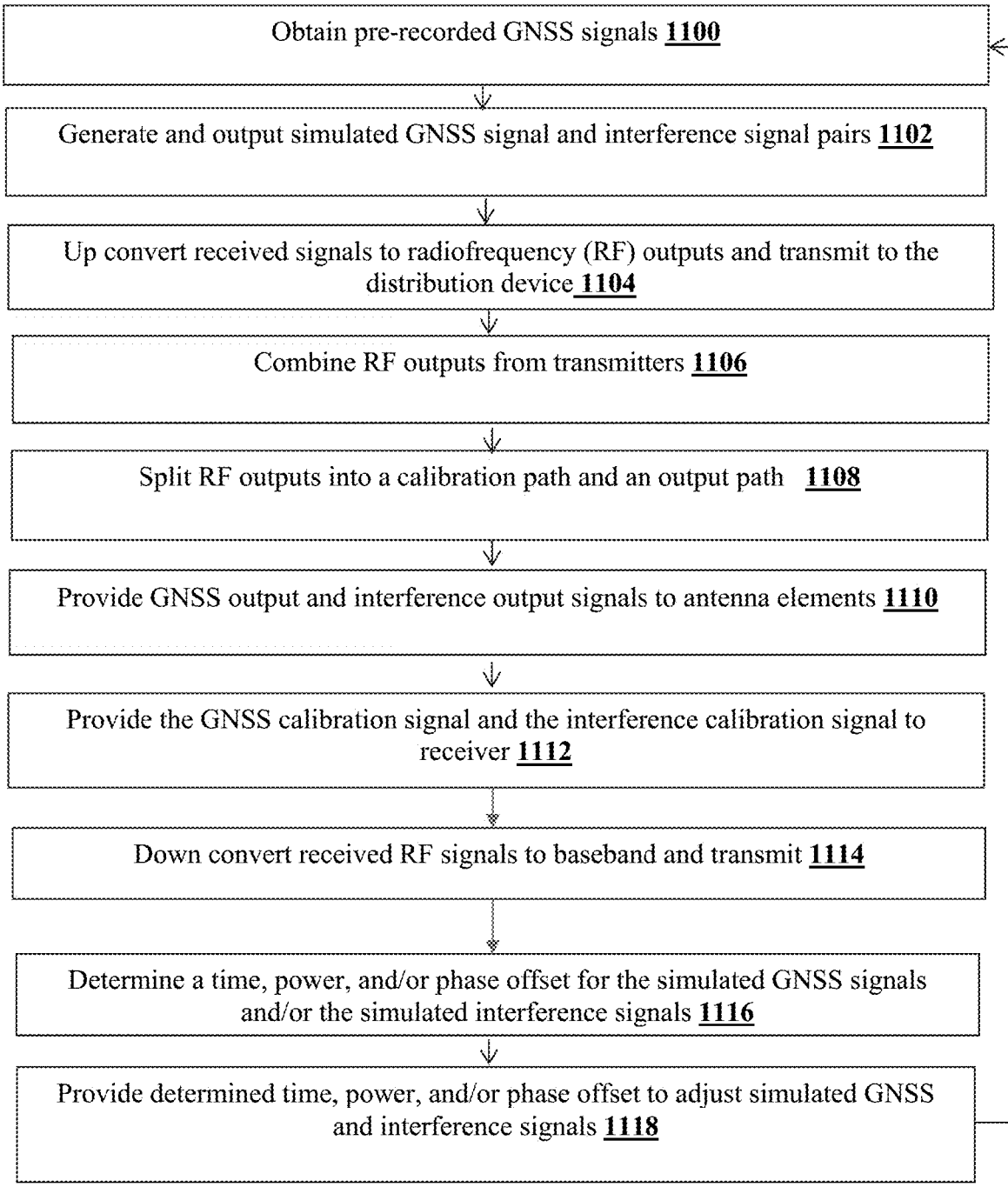
FIG. 11 is a flow chart of the method of playback of adjusted GNSS signals using the GNSS playback system of FIG. 7.
Figure 12:
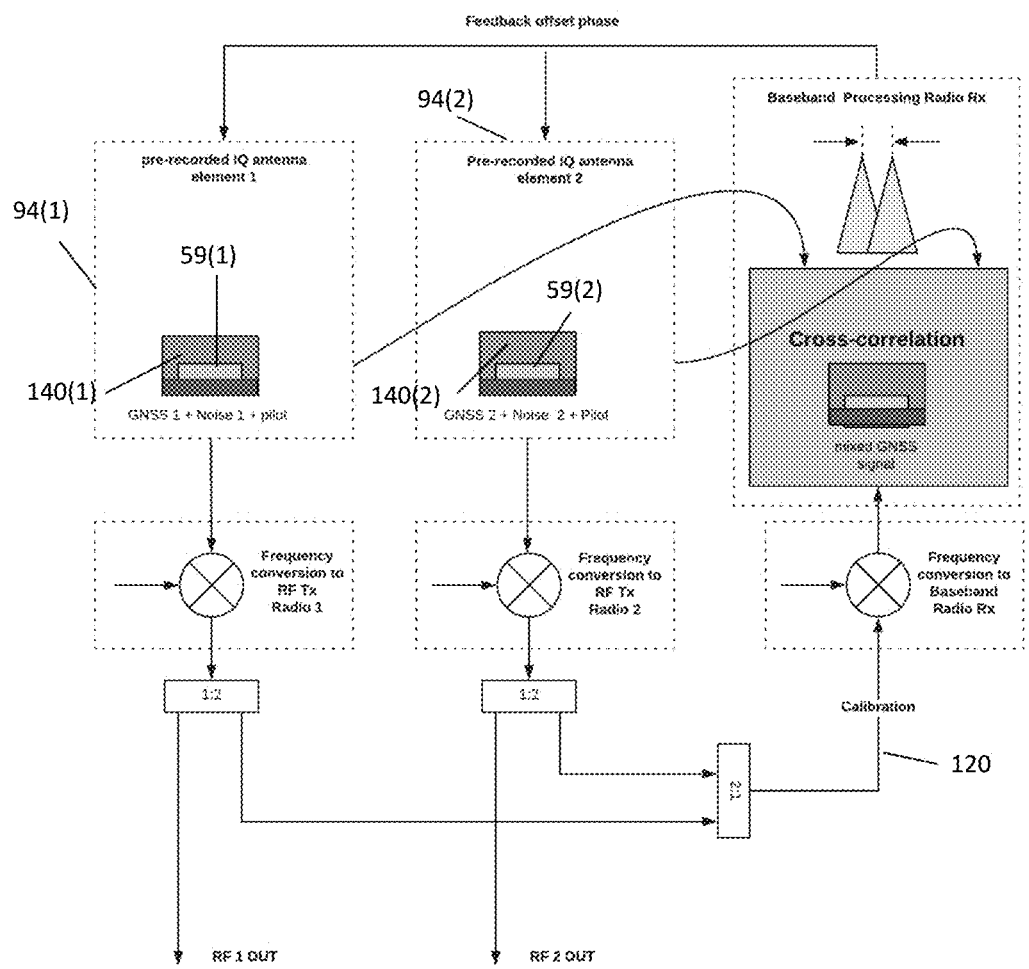
FIG. 12 is a block diagram illustrating one example of a feedback method for the GNSS playback system of FIG. 7.

Accordingly, the memory 134 of the offset monitoring computing device 76 can store application(s) that can include executable instructions that, when executed by the offset monitoring computing device 76, cause the offset monitoring computing device 76 to perform actions, such as performing a cross-correlation analysis of the pre-recorded GNSS calibration signal 120 and/or the interference calibration signal 124 to determine time and/or phase offset such as illustrated and described by way of the examples herein such as FIGS. 11 and 12. The application(s) can be implemented as modules or components of other application(s). Further, the application(s) can be implemented as operating system extensions, modules, plugins, or the like.

The communication interface 136 of the offset monitoring computing device 76 operatively couples and communicates between the offset monitoring computing device 76, the receive SDR 82, and the playback computing device 74, which are all coupled together by one or more communication network(s), although other types and/or numbers of connections and/or configurations to other device and/or elements can be used. In this example, the offset monitoring computing device 76 is coupled to the receive SDR 82 by the high data rate (e.g., 10 Gb) Ethernet connection 96 and to the playback computing device 74 by the low rate (e.g., 1 Gb) Ethernet connection 97, although other topologies may be employed. By way of example only, the communication network(s) can include local area network(s) (LAN(s)) or wide area network(s) (WAN(s)), and/or wireless networks, although other types and/or number of protocols and/or communication network(s) can be used.

Although the playback computing device 74, offset monitoring computing device 76, and the distribution device 80 are illustrated and described in the illustrative examples herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s). In some examples, the devices can be part of a rackmount system. Further, the GNSS playback system 70 (FIG. 7) can be coupled with and/or share hardware with the GNSS recording system 10 (FIG. 1) described above.

Portions of all of the examples of the technology illustrated and described herein may also be embodied as one or more non-transitory computer readable media having instructions stored thereon for one or more aspects of the present technology. The instructions in some examples include executable code that when executed by the processor of either the simulation computing device or the offset monitoring computing device 76, cause the processor to carry out steps necessary to implement the methods of the examples of this technology that are illustrated and described herein.

An exemplary method for GNSS playback for testing a CRPA system and optional interference simulation will now be described with reference to FIGS. 7-12. Referring more specifically to FIG. 11, in step 1100, the playback computing device 74 obtains pre-recorded GNSS signals, such as the adjusted GNSS signals 59(1)-59(4). The pre-recorded GNSS signals may be stored in the memory 88 of the playback computing device 74, or may be obtained from another source such as the SDR control computing device 24 or the storage device 26 shown in FIG. 1. The playback computing device 74 may also optionally generate simulated interference signals to be associated with the pre-recorded GNSS signals to provide signal pairs 94(1)-94(4). The optional simulated interference signals may include, by way of example only, spoofers, repeaters, or jammers, although other interference signals may be generated. The term interference is used to designate non-intentional and intentional jammers, as well as spoofers and repeaters, that can be simulated. In one example, each of the pre-recorded GNSS signals are coherent. In one example, the optional simulated interference signals are produced using a simulator stored on the simulation computing device such as the Skydel software produced by Orolia Canada (Montreal, Canada), although other simulation application(s) for generating simulated GNSS and interference signals may be utilized. In this example, the modulation for the plurality of pre-recorded GNSS signal and interference signal pairs is performed using graphical processing units (GPUs) of the playback computing device 74, although other processing techniques may be utilized. In one example, the thermal noise that is part of the recorded GNSS signals is used as a reference pilot.

Next, in step 1102, the plurality of pre-recorded GNSS signals and interference signal pairs 94(1)-94(4) are output as baseband signals to the four transmit SDRs 78(1)-78(4), although any number of transmit SDRs may be utilized in the disclosed playback method. In one example, at least sixteen transmitters are used as shown in FIG. 8. The plurality of pre-recorded GNSS signal and simulated interference signal pairs 94(1)-94(4) are streamed continuously in real time as the digital complex IQ baseband signals to the transmit SDRs 78(1)-78(4). Each of the transmit SDRs 78(1)-78(4) receives an independent baseband signal for each of the plurality of pre-recorded GNSS signal and simulated interference signal pairs 94(1)-94(4) from the playback computing device 74.

In step 1104, the transmit SDRs 78(1)-78(4) up convert the digital complex IQ baseband signals for the plurality of pre-recorded GNSS signal and simulated interference signal pairs 94(1)-94(4) received from the playback computing device 74 to radiofrequency (RF) outputs for the pre-recorded GNSS signals 98(1)-98(4) and RF outputs for the optional interference signals 100(1)-100(4), and transmit these RF outputs to the distribution device 80. Each of the transmit SDRs 78(1)-78(4) optionally employ two RF outputs including the RF outputs for the pre-recorded GNSS signal 98(1)-98(4) and the RF outputs for the simulated interference signal 100(1)-100(4), respectively, although a single RF output can be utilized when only playing back the pre-recorded GNSS signal. The RF outputs for the pre-recorded GNSS signals 98(1)-98(4) are transmitted to the GNSS channel 106 of the distribution device 80, while the RF outputs for the simulated interference signals 100(1)-100(4) are transmitted to the interference channel 108 of the distribution device 80, as shown in FIG. 8. The transmit SDRs 78(1)-78(4) are synchronized using the 10 MHz clock signal 102 and the 1 PPS clock signal 104 from the reference clock 84, by way of example only.

Next, in step 1106, the distribution device 80 combines the RF outputs for the pre-recorded GNSS signals 98(1)-98(4) in the 4:1 combiner 110 of the GNSS channel 106 and the RF outputs for the simulated interference signals 100(1)-100(4) in 4:1 combiner 112 of the interference channel 108 to generate combined GNSS signal 117 and combined simulated interference signal 119, respectively. Combining the four signals for each the RF outputs for the pre-recorded GNSS signals 98(1)-98(4) and the RF outputs for the simulated interference signals 100(1)-100(4) to generate combined GNSS signal 117 and combined simulated interference signal 119, respectively, allows for coverage of the entire GNSS spectrum.

In step 1108, the distribution device 80 splits the received RF outputs in each channel including the combined GNSS signal 117 and the combined simulated interference signal 119, respectively, to create an output path and a calibration path. As illustrated in FIG. 5, the distribution device 80 splits the combined GNSS signal and the combined simulated interference signals 119 using the 1:2 splitters 114 and 116, respectively. In this system, the distribution device 80 generates the pre-recorded GNSS output signal 118 and the pre-recorded GNSS calibration signal 120 in the GNSS channel 106. The distribution device 80 also generates the interference output signal 122 and the interference calibration signal 124 in the interference channel 108.

In step 1110, each of the split pre-recorded GNSS output signals 118 and the simulated interference output signal 122 along the output path are then combined in the 2:1 combiner 126 and are output in various channels of the distribution device 80 to the antenna element inputs of the CRPA element 12(1)-12(4) from which they originated for playback of the pre-recorded GNSS signals and the simulated interference signals for testing the CRPA system.

Next, in step 1112, the pre-recorded GNSS calibration signal 120 and the simulated interference calibration signal 124 are output, respectively, to the inputs of the receive SDR 82, as shown in FIG. 4. In one example, a plurality of calibration signals are combined by the distribution device 80 in each channel. The distribution device 80 provides the pre-recorded GNSS calibration signal 120 and the simulated interference calibration signal 124 to the receive SDR 82 through the RF inputs.

In step 1114, the receive SDR 82 down converts the received RF signals including the pre-recorded GNSS calibration signal 120 and the simulated interference calibration signal 124 to baseband and transmits the baseband signals to the offset monitoring computing device 76 for further processing.

Next, in step 1116 the offset monitoring computing device 76 determines a phase, time, and/or power offset for the simulated pre-recorded GNSS output signal 120 using the baseband pre-recorded GNSS calibration signal, which includes the thermal noise as a reference signal. In this example, the phase, time, and/or power offsets are determined using a cross-correlation technique as described with reference to FIG. 12 below.

FIG. 12 illustrates an exemplary method of determining the phase, time, and/or power offset for two of the exemplary pre-recorded GNSS signals associated with antenna elements from which the GNSS signals were recorded, such as the adjusted GNSS signals 59(1) and 59(2) generated in the examples of FIGS. 4-6. Although the process is described with respect to two signals, it is to be understood that the exemplary method could be applied to any number of pre-recorded GNSS signals. The pre-recorded adjusted GNSS signals 59(1) and 59(2) each include thermal noise 140(1) and 140(2), respectively, that is used as a reference. In other examples, the pre-recorded GNSS signals may also include the pilot reference signal that was used in the recording and adjusting operation as described above, although in other examples the pilot may have been removed prior to storage of the pre-recorded signals.

The pre-recorded adjusted GNSS signals 59(1) and 59(2) are output along with a simulated interference signal in signal pairs 94(1) and 94(2) in baseband by the playback computing device 74 to the transmit SDRs 78(1) and 78(2) where they are converted to RF signals including the RF GNSS output signals 98(1) and 98(2) and the RF simulated interference signals 100(1) and 100(2). The pre-recorded GNSS signals and their associated thermal noise (the thermal noise is different for each antenna element) in the illustrated example, are output by the transmit SDRs 78(1) and 78(2) as the RF outputs, which are combined by the distribution device 80 in a calibration GNSS signal. The combined signals in the calibration GNSS signal are then converted back to baseband by the receive SDR 82 and transmitted to the offset monitoring computing device 76 for the cross-correlation processing.

To determine the phase, time, and/or power offset, one cross-correlation peak is obtained for each of the thermal noise signals associated with the pre-recorded GNSS signals, such as adjusted GNSS signals 59(1) and 59(2) using standard techniques. Each cross-correlation peak contains information about the time, power, and/or phase offset between the reference coming from the combined GNSS calibration signal 120. The relative time, power and/or phase offset between two correlation peaks are measured, averaged, and applied to the combined pre-recorded GNSS signals to compensate for the phase, time, and/or power offset.

Next, in step 1118 the offset monitoring computing device 76 provides the determined phase, time, and/or power offsets to the playback computing device 74. The playback computing device 74 utilizes the phase and time offset to adjust the modulation of the pre-recorded GNSS signals that are part of the baseband signals and the exemplary method is repeated.

The systems and methods of the present technology advantageously allow for recording GNSS signals, adjusting the recorded GNSS signals, and playing recorded GNSS signals back for testing a CRPA system. The hardware required provides a cost efficient solution for record and playback operations. The architecture is also compatible with GNSS simulator systems. Additionally, this technology provides methods and systems that provide for GNSS record and playback with continuous time, phase, and/or power offset correction. Further, additional artificial or pre-recorded jammers can be associated with the signals during playback for more comprehensive testing of the CRPA system.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
receiving from a plurality of radiofrequency receivers, a plurality of baseband signals, each of the plurality of baseband signals generated from a radiofrequency signal from a GNSS antenna and a pilot reference signal, wherein the pilot reference signal is the same for each of the baseband signals and each of the plurality of baseband signals is amplified and below a thermal noise floor;
calculating, by a computing device, a phase offset, a time offset, and a power offset for each of the plurality of baseband signals based on the pilot reference signal; and adjusting, by the computing device, each of the baseband signals based on the calculated phase offset, time offset, and power offset for each of the plurality of baseband signals.

2. The method of claim 1, wherein the calculating the phase offset, the time offset, and the power offset further comprises:
determining, by the computing device, a cross-correlation peak between at least two of the plurality of baseband signals based on the pilot reference signal; and
calculating, by the computing device, the phase offset, the time offset, and the power offset based on the determined cross-correlation peak.

3. The method of claim 1, wherein the phase offset, the time offset, and the power offset are calculated in real-time.

4. The method of claim 1 further comprising:
determining, by the computing device, one or more items of navigational data for each of the GNSS antennas based on the plurality of baseband signals.

5. The method of claim 1 further comprising:
removing, by the computing device, the pilot reference signal from each of the adjusted plurality of baseband signals prior to storing the baseband signals.

6. The method of claim 1 further comprising:
generating, by the computing device, the pilot reference signal, wherein the pilot reference signal is generated to avoid degradation of the baseband signals.

7. The method of claim 1 further comprising:
storing, by the computing device, the adjusted plurality of baseband signals as a baseband IQ file.

8. The method of claim 1 further comprising:
outputting, by the computing device, the plurality of adjusted baseband signals to an input of a controlled radiation pattern antenna unit as the signals that were recorded at the controlled radiation pattern antenna element outputs from which the baseband signal was formed for testing the controlled radiation pattern antenna system.

9. The method of claim 1 further comprising:
outputting, by the computing device, the plurality of adjusted baseband signals to a plurality of radiofrequency transmitters, wherein each of the adjusted baseband signals includes thermal noise that provides a reference signal for each of the adjusted baseband signals;
receiving, by the computing device, from a radiofrequency receiver, a calibration signal that combines each of the adjusted baseband signals and the associated reference signals;
calculating, by the computing device, one or more of a phase offset, a time offset, and a power offset for each of the plurality of adjusted baseband signals based on the calibration signal and the associated reference signals for each of the plurality of baseband signals; and
outputting, by the computing device, a corrected plurality of adjusted baseband signals to the plurality of radiofrequency transmitters based on the calculated phase offset, time offset, and power offset for each of the simulated GNSS signals or for each of the simulated interference signals.

10. The method of claim 9, wherein calculating the phase offset, the time offset, and the power offset comprises:
determining, by the computing device, a cross-correlation peak between the calibration signal and at least one of the associated reference signals; and
calculating, by the computing device, the phase offset, the time offset, and the power offset based on the determined cross-correlation peak.

11. The method of claim 9, wherein the plurality of adjusted baseband signals are continuously output.

12. The method of claim 9 further comprising:
outputting, by the computing device, a plurality of simulated interference signal pairs associated with the plurality of adjusted baseband signals to the plurality of radiofrequency transmitters.

13. A non-transitory machine readable medium having stored thereon instructions comprising executable code that when executed by one or more processors, cause the processors to:
receive from a plurality of radiofrequency receivers, a plurality of baseband signals, each of the plurality of baseband signals generated from a radiofrequency signal from a GNSS antenna and a pilot reference signal, wherein the pilot reference signal is the same for each of the baseband signals and each of the plurality of baseband signals is amplified and below a thermal noise floor;
calculate a phase offset, a time offset, and a power offset for each of the plurality of baseband signals based on the pilot reference signal; and
adjust each of the plurality of baseband signals based on the calculated phase offset, time offset, and power offset for each of the plurality of baseband signals.

14. The medium of claim 13 having stored thereon at least one additional instruction comprising executable code for calculating the phase offset, the time offset, and the power offset that when executed by one or more processors, cause the processors to:
determine a cross-correlation peak between at least two of the plurality of baseband signals based on the pilot reference signal; and
calculate the phase offset, the time offset, or the power offset based on the determined cross-correlation peak.

15. The medium of claim 13, wherein the phase offset, the time offset, and the power offset are calculated in real-time.

16. The medium of claim 13 having stored thereon at least one additional instruction comprising executable code that when executed by the one or more processors, cause the one or more processors to determine one or more items of navigational data for each of the GNSS antennas based on the plurality of baseband signals.

17. The medium of claim 13 having stored thereon at least one additional instruction comprising executable code that when executed by the one or more processors, cause the one or more processors to remove the pilot reference signal from each of the adjusted plurality of baseband signals prior to storing the baseband signals.

18. The medium of claim 13 having stored thereon at least one additional instruction comprising executable code that when executed by the one or more processors, cause the one or more processors to generate the pilot reference signal, wherein the pilot reference signal is generated to avoid degradation of the baseband signals.

19. The medium of claim 13 having stored thereon at least one additional instruction comprising executable code that when executed by the one or more processors, cause the one or more processors to store the adjusted plurality of baseband signals as a baseband IQ file.

20. The medium of claim 13 having stored thereon at least one additional instruction comprising executable code that when executed by the one or more processors, cause the one or more processors to output the plurality of adjusted baseband signals to an input of a controlled radiation pattern antenna unit as the signals that were recorded at the controlled radiation pattern antenna element outputs from which the baseband signal was formed for testing the controlled radiation pattern antenna system.

21. The medium of claim 13 having stored thereon at least one additional instruction comprising executable code that when executed by the one or more processors, cause the one or more processors to:
  output the plurality of adjusted baseband signals to a plurality of radiofrequency transmitters, wherein each of the adjusted baseband signals includes thermal noise that provides a reference signal for each of the adjusted baseband signals;
  receive from a radiofrequency receiver, a calibration signal that combines each of the adjusted baseband signals and the associated reference signals;
  calculate one or more of a phase offset, a time offset, and a power offset for each of the plurality of adjusted baseband signals based on the calibration signal and the associated reference signals for each of the plurality of baseband signals; and
  output a corrected plurality of adjusted baseband signals to the plurality of radiofrequency transmitters based on the calculated phase offset, time offset, and power offset for each of the simulated GNSS signals or for each of the simulated interference signals.

22. The medium of claim 21 having stored thereon at least one additional instruction comprising executable code for calculating the phase offset, the time offset, and the power offset that when executed by the one or more processors, cause the one or more processors to:
  determine a cross-correlation peak between the calibration signal and at least one of the associated reference signals; and
  calculate the phase offset, the time offset, and the power offset based on the determined cross-correlation peak.

23. The medium of claim 21, wherein the plurality of adjusted baseband signals are continuously output.

24. The medium of claim 21 having stored thereon at least one additional instruction comprising executable code that when executed by the one or more processors, cause the one or more processors to output a plurality of simulated interference signal pairs associated with the plurality of adjusted baseband signals to the plurality of radiofrequency transmitters.

25. A GNSS record and playback apparatus comprising:
  a memory comprising programmed instructions stored thereon and one or more processors configured to be capable of executing the stored programmed instructions to:
    receive from a plurality of radiofrequency receivers, a plurality of baseband signals, each of the plurality of baseband signals generated from a radiofrequency signal from a GNSS antenna and a pilot reference signal, wherein the pilot reference signal is the same for each of the baseband signals and each of the plurality of baseband signals is amplified and below a thermal noise floor;
    calculate a phase offset, a time offset, and a power offset for each of the plurality of baseband signals based on the pilot reference signal; and
    adjust each of the plurality of baseband signals based on the calculated phase offset, time offset, and power offset for each of the plurality of baseband signals.

26. The apparatus of claim 25, the apparatus having stored thereon at least one additional instruction comprising executable code that when executed by one or more processors, cause the processors to:
  determine a cross-correlation peak between at least two of the plurality of baseband signals based on the pilot reference signal; and
  calculate the phase offset, the time offset, and the power offset based on the determined cross-correlation peak.

27. The apparatus of claim 25, wherein the phase offset, the time offset, and the power offset are calculated in real-time.

28. The apparatus of claim 25, the apparatus having stored thereon at least one additional instruction comprising executable code that when executed by one or more processors, cause the processors to determine one or more items of navigational data for each of the GNSS antennas based on the plurality of baseband signals.

29. The apparatus of claim 25, the apparatus having stored thereon at least one additional instruction comprising executable code that when executed by one or more processors, cause the processors to remove the pilot reference signal from each of the adjusted plurality of baseband signals prior to storing the baseband signals.

30. The apparatus of claim 25, the apparatus having stored thereon at least one additional instruction comprising executable code that when executed by one or more processors, cause the processors to generate the pilot reference signal, wherein the pilot reference signal is generated to avoid degradation of the baseband signals.

31. The apparatus of claim 25, the apparatus having stored thereon at least one additional instruction comprising executable code that when executed by one or more processors, cause the processors to store the adjusted plurality of baseband signals as a baseband IQ file.

32. The apparatus of claim 25, the apparatus having stored thereon at least one additional instruction comprising executable code that when executed by one or more processors, cause the processors to output the plurality of adjusted baseband signals to an input of a controlled radiation pattern antenna unit as the signals that were recorded at the controlled radiation pattern antenna element outputs from which the baseband signal was formed for testing the controlled radiation pattern antenna system.

33. The apparatus of claim 25, the apparatus having stored thereon at least one additional instruction comprising executable code that when executed by one or more processors, cause the processors to:
  output the plurality of adjusted baseband signals to a plurality of radiofrequency transmitters, wherein each of the adjusted baseband signals includes thermal noise that provides a reference signal for each of the adjusted baseband signals;
  receive from a radiofrequency receiver, a calibration signal that combines each of the adjusted baseband signals and the associated reference signals;
  calculate one or more of a phase offset, a time offset, and a power offset for each of the plurality of adjusted baseband signals based on the calibration signal and the associated reference signals for each of the plurality of baseband signals; and
  output a corrected plurality of adjusted baseband signals to the plurality of radiofrequency transmitters based on the calculated phase offset, time offset, and power offset for each of the simulated GNSS signals or for each of the simulated interference signals.

34. The apparatus of claim 33, the apparatus having stored thereon at least one additional instruction comprising executable code that when executed by one or more processors, cause the processors to:
  determine a cross-correlation peak between the calibration signal and at least one of the associated reference signals; and
  calculate the phase offset, the time offset, and the power offset based on the determined cross-correlation peak.

35. The apparatus of claim 33, wherein the plurality of adjusted baseband signals are continuously output.

36. The apparatus of claim 33, the apparatus having stored thereon at least one additional instruction comprising executable code that when executed by one or more processors, cause the processors to output a plurality of simulated interference signal pairs associated with the plurality of adjusted baseband signals to the plurality of radiofrequency transmitters.

* * * * *